Nov. 23, 1965 H. W. HUFFMAN 3,219,202

SCREW PILE AND BATCH DELIVERY

Filed May 17, 1962

6 Sheets-Sheet 1

INVENTOR.
HAROLD W. HUFFMAN
BY J. Warren Kinney, Jr.
ATTORNEY

SCREW PILE AND BATCH DELIVERY

Filed May 17, 1962

INVENTOR.
HAROLD W. HUFFMAN
BY J. Warren Kinney, Jr.
ATTORNEY

Nov. 23, 1965 H. W. HUFFMAN 3,219,202

SCREW PILE AND BATCH DELIVERY

Filed May 17, 1962

6 Sheets-Sheet 3

INVENTOR.
HAROLD W. HUFFMAN
BY J. Warren Kinney, Jr.
ATTORNEY

INVENTOR.
HAROLD W. HUFFMAN
BY J. Warren Kinney, Jr.
ATTORNEY

Nov. 23, 1965 H. W. HUFFMAN 3,219,202

SCREW PILE AND BATCH DELIVERY

Filed May 17, 1962 6 Sheets-Sheet 5

INVENTOR.
HAROLD W. HUFFMAN
BY
J. Warren Kinney, Jr.
ATTORNEY

SCREW PILE AND BATCH DELIVERY

Filed May 17, 1962 6 Sheets-Sheet 6

INVENTOR.
HAROLD W. HUFFMAN
BY
J. Warren Kinney, Jr.
ATTORNEY

United States Patent Office 3,219,202
Patented Nov. 23, 1965

3,219,202
SCREW PILE AND BATCH DELIVERY
Harold W. Huffman, Hamilton, Ohio, assignor to The Hamilton Tool Company, Hamilton, Ohio, a corporation of Ohio
Filed May 17, 1962, Ser. No. 195,627
14 Claims. (Cl. 214—6)

This invention relates to a continuous web processing device, and more particularly to means for automatically severing a continuous web into uniformly sized sheets or sub-assemblies which are individually advanced in a substantially horizontal direction for a predetermined distance, then individually lowered onto the top of the preceding sheet or sub-assembly for providing a pile or stack containing a predetermined number of similar sheets, after which the entire pile or stack of sheets is automatically discharged vertically, as a unit, onto a conveyor without interrupting or affecting the continuous feeding of succeeding sheets into a subsequent pile or stack.

An object of the invention is to provide means in association with a rotary cut-off mechanism for positively engaging and suddenly accelerating the forward movement or rate of linear travel of each sheet as it is severed from a continuous web which is continuously advanced to the cut-off mechanism, and of lifting or elevating the lead end of the severed sheet against means which automatically introduce the sheet forwardly onto one of a series of spirally arranged thread plates of a continuously rotating piling screw assembly which simultaneously advances the individual sheet a predetermined distance forwardly while simultaneously lowering it vertically onto the thread plate of an intermittently rotatable batching screw mechanism.

Another object of the invention is to provide means for automatically effecting a separation between the trailing edge of a severed sheet and the leading edge of the next successive sheet, and for positively lowering the trailing edge of a severed sheet beneath the leading edge of the next successive sheet to be severed from the web.

Another object of the invention is to provide simple, foolproof, fully automatic means having no moving parts for elevating the leading edge of a severed sheet as aforesaid.

A further object of the invention is to provide means for continuously rotating the spirally arranged thread plates of the piling screw assembly and for imparting a single, timed revolution of the spiral thread plate assembly of the batching screw mechanism, after a predetermined number of individual sheets or sub-assemblies have been deposited from the piling screw onto the thread plates of the batching screw mechanism.

Another object of the invention to provide simple, effective, foolproof means for positively insuring that the thread-plate-adjacent portions of each sheet deposited on the thread plates of the batching screw mechanism are disposed below the leading edge of the upper thread plate of the batching screw mechanism whereby to insure that the first or lowermost sheet of the next batch of sheets to be supported on the thread plate of the batching screw mechanism will be definitely separated from the last or topmost sheet of the batch of sheets being discharged from the batching mechanism incident to a single rotation thereof.

Still another object of the invention is to provide simple yet highly effective means in association with the piling screw assembly for automatically jogging the four corners of the sheets being transferred by the thread plates of the piling screw assembly and batching mechanism.

Still another object of the invention is to provide means for stacking a plurality of individual sheets which have been successively severed from a continuous web, wherein the severed sheets are individually conveyed forwardly and lowered directly onto the top of the preceding sheet of a pile of similar sheets. The present invention is particularly useful in handling webs which have been extensively perforated, such as, by way of example, webs of trading stamps which are severed into sheets containing a plurality of individual stamps, which sheets are stacked in piles which constitute a book of stamps as sold to merchandisers for distribution to the public. Heretofore the problem of gathering the individual sheets of such books has resulted in slow, expensive, unsatisfactory results. My invention permits such stamps to be printed and perforated on modern high speed rotary presses and then be severed into individual sheets, stacked, counted, and segregated in individual piles or stacks, each containing the number of sheets of a completed book—all at the speed of delivery of the web from the rotary press.

These and other objects are attained by the means disclosed herein and as described in the accompanying drawings, in which.

Figure 15:
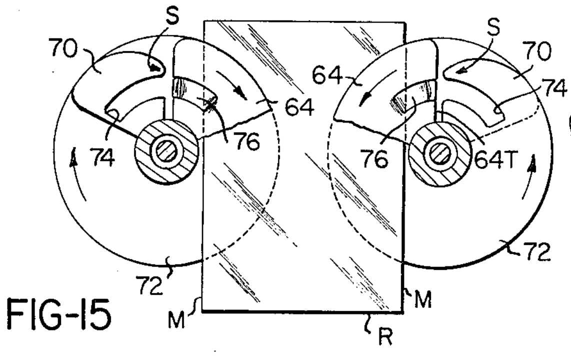
Figures 4, 5, 6, 16, 17:
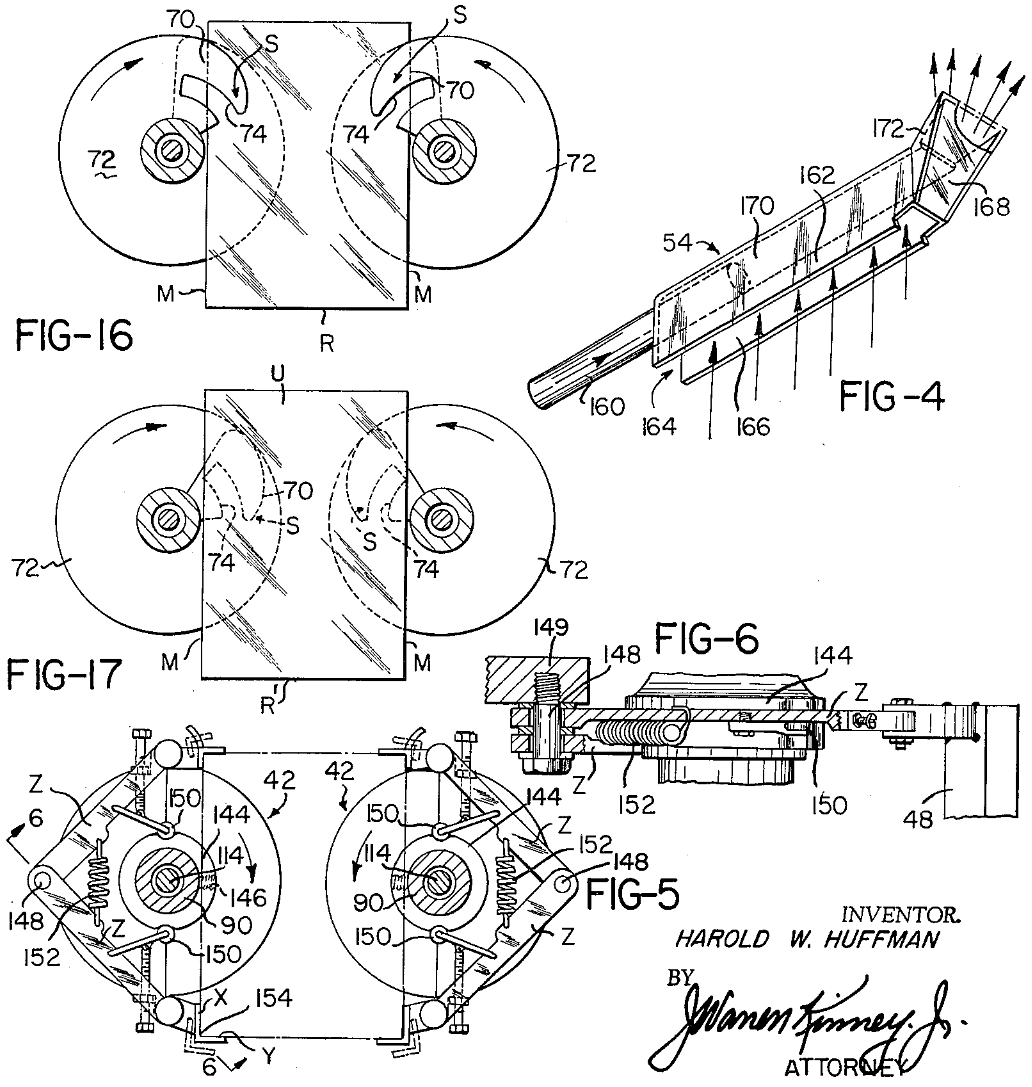
FIG. 4 is a perspective view of the sheet elevating means which comprises a detail of the present invention.
FIG. 5 is a view taken on line 5—5 of FIG. 1.
FIG. 6 is a view taken on line 6—6 of FIG. 5.

FIGS. 15, 16 and 17 disclose the sequential relationship of the thread plate and leading edge of the uppermost thread plate of the batching screw mechanism showing, in succession, the manner in which a pile of sheets is supported on the lowermost thread plate of the batching screw mechanism until such time as a predetermined number of sheets have been accumulated, after which the thread plates are rotated for advancing the leading edge of the upper thread plate over the uppermost sheet of the pile for thereby effectively and automatically supporting the first or lowermost sheet of the next pile on the leading edge of the upper thread plate for thereby effecting a positive separation of the sheets of successive piles.

Figure 18:
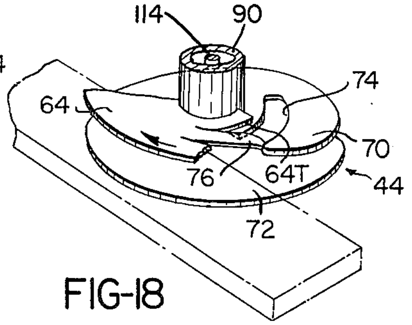

FIG. 18 is a perspective view illustrating the relationship between the depending finger of the trailing edge of the lowermost thread plate of the piling screw assembly with an arcuate slot provided in the leading edge of the uppermost thread plate of the batching screw mechanism.

Figures 3, 19:
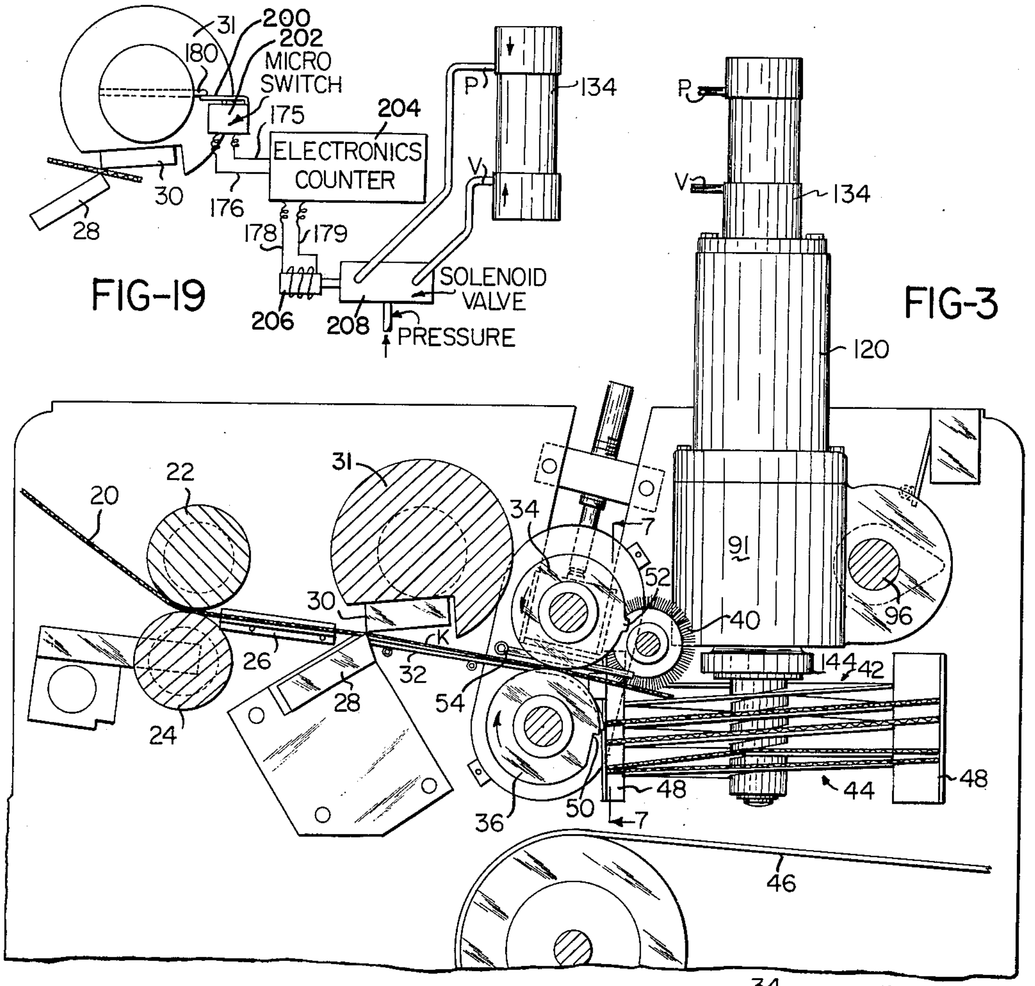
FIG. 3 is a view taken on line 3—3 of FIG. 2.

FIG. 19 is a schematic view of means embodying the teachings of the invention, for actuating the batching screw mechanism.

With particular reference now to FIG. 3, the numeral 20 denotes generally a continuous web of material comprising one or more thicknesses of paper, or the like, which is caused to pass between a gripper pull unit comprising upper and lower elements denoted by the numerals 22 and 24, which positively advance web 20 to and through guide plates 26. Web 20 is cut into predetermined lengths by the flying shear-type cutoff mechanism which includes a stationary knife 28 and a rotating knife 30 carried by rotatable cylinder 31.

The present invention is neither directed to nor concerned with the particular structural details of the flying shear-type cutoff and/or the gripper pull unit, since these items are well known in the art.

The sheets severed by the cutoff assembly will be advanced across and deposited on support plate 32, and thence advanced to and between a pinch feed which comprises a gripper wheel, preferably or rubber, denoted by the numeral 34, and a lower segmented steel cylinder 36. The segmented steel cylinder 36 is provided with annular grooves 37—note FIG. 7—into which stripping fingers 38 of support 32 are seated.

It will be noted that the relative speed of rotation of the pinch feed assembly comprising rolls 34 and 36 is such as to impart a positive forward pull to the trailing edge of the sheet severed by rotating knife 30 to positively break any remaining fibers interconnecting the severed edges of the web at 30, and it also positively advances the trailing edge of the just-having-been-severed sheet forwardly from the leading edge of the following sheet.

The individual sheet denoted generally by the letter K is advanced forwardly under brush 40, and thence advanced into a piling screw assembly comprising a pair of laterally spaced, spirally arranged thread plates denoted generally by the numeral 42.

Figure 1:
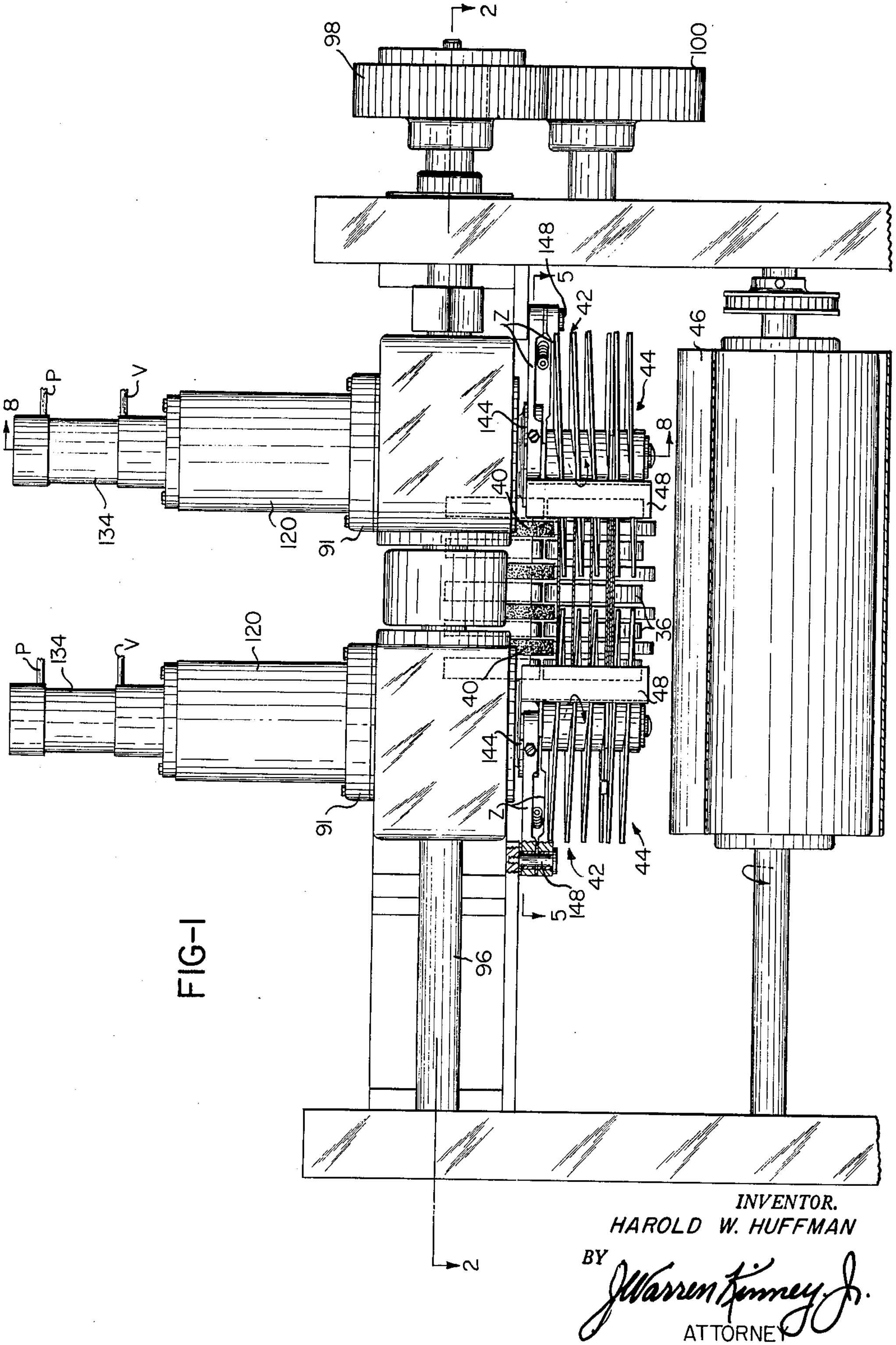
FIG. 1 is an end elevation of the discharge end of a device embodying the teachings of the present invention.

As best illustrated in FIG. 1, it will be noted that the sheet K is discharged between the uppermost of the thread plates of piling screws 42. The individual thread plates are adapted to simultaneously support, advance and lower the individual sheets incident to rotation of the respective screws for thereby depositing the individual sheets successively onto the thread plates of a lower batching screw mechanism denoted generally by the numeral 44. After a predetermined number of sheets have been discharged from the piling screw assembly onto the batching screw mechanism, the batching screw will be automatically actuated to make one rotation for the purpose of depositing the batch of sheets stacked thereon directly onto a conveyor such as, by way of example, 46. During this operation, the succeeding individual sheets K are being successively introduced into and between the piling screws 42 until the predetermined number has been accumulated on the batching screw, after which it will be again actuated for depositing a predetermined number of sheets onto the conveyor. This operation will be repeated continuously and at such operational speeds as to accommodate the rate at which web 10 is fed from a high speed rotary press.

A further object of the invention is to provide simple yet highly effective means for automatically aligning the various sheets introduced into the piling screw assembly for effecting exact vertical alignment of the various sheets of a pile by means of a jogging assembly which will be hereinafter more fully explained. The joggers are indicated on FIG. 3 by the numerals 48.

At this point it should be clearly understood that the present device has been particularly designed to handle sheets which individually are difficult to slide over one another incident to being vertically stacked in a pile. The web 10 and the individual sheets K severed therefrom may be perforated, punched, gummed and/or carbon coated, and by means of the present invention each sheet will be individually supported and advanced forwardly to a predetermined position or station while being physically separated from the preceding sheet and from the next succeeding sheet by means of a metal thread plate or intervening member; in other words, no relative motion occurs between contacting faces of the superposed sheets. The present mechanism makes it commercially feasible to advance each individual sheet to a predetermined location and then lower said sheet vertically directly onto the upper surface of the next lower sheet in such a manner as to effectively avoid the complications heretofore encountered when handling such sheets, particularly sheets of trading stamps.

Figure 11:
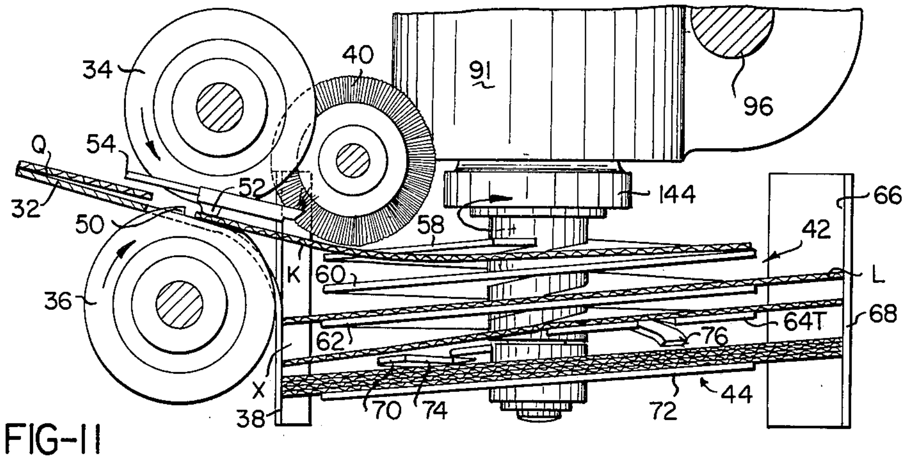
FIG. 11 is a side view showing, in enlarged detail, the manner in which a severed sheet is fed forwardly on the thread plates of the piling screw assembly and illustrating the relationship between the joggers and the trailing edge of a sheet and the leading edge of the next sheet and showing an accumulation of piled sheets stacked on a thread plate of the batching screw mechanism.
Figure 12:
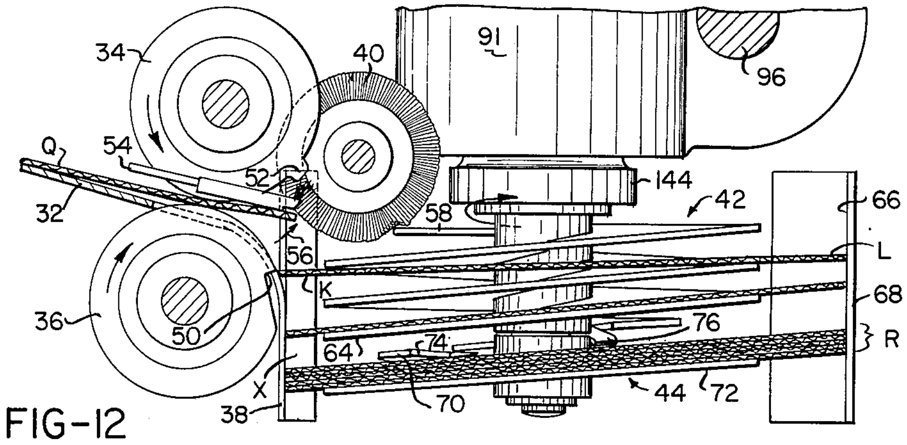
FIG. 12 is a view similar to FIG. 11, showing the manner in which a sheet is delivered to the pile position from the pinch position of FIG. 11.
Figure 13:
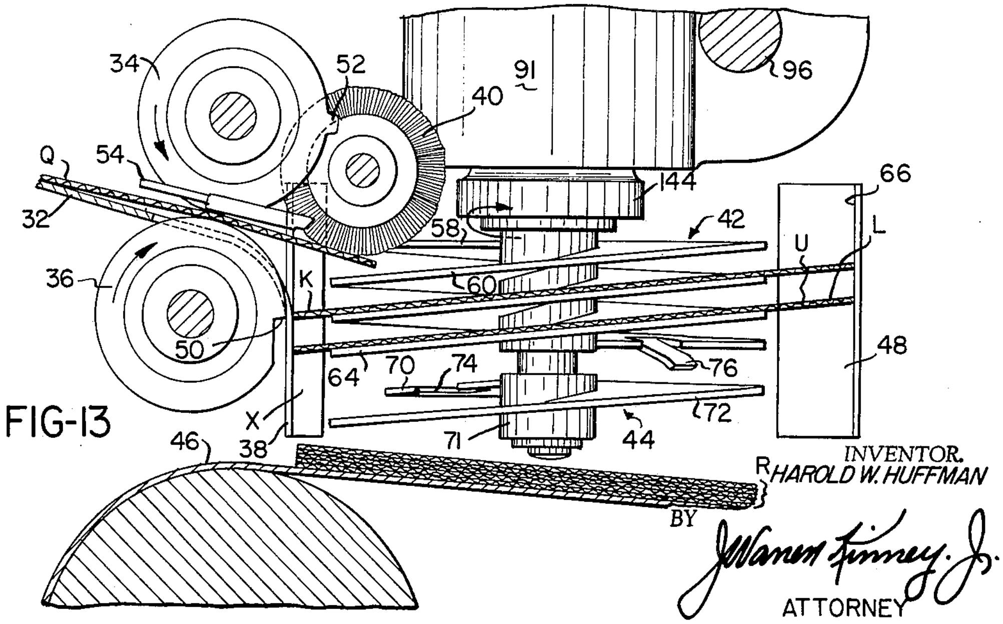
FIG. 13 is a view similar to FIG. 12, illustrating the pile of sheets as they are discharged from the thread plates of the batching screw mechanism.

With particular reference now to FIGS. 11, 12 and 13, it will be noted that the lower segmented cylinder 36 is provided with a transversely extending notch denoted by the numeral 50; and that the upper rubber gripper wheel 34 is provided with a depressor member 52 which extends transversely of each of the gripper wheels and which in effect comprises a tooth-like element projecting radially from the outer periphery of each of the wheels 34. Wheels 34 and cylinder 36 are operated in timed relationship with the cutoff knife 30, whereby the trailing edge of a first sheet, such as K, will be positively depressed into notch 50 by reason of the action of depressor member 52 which, as illustrated in FIG. 11, has lowered the trailing edge of sheet K into notch 50. When thus lowered, the trailing edge of sheet K will be disposed beneath and/or below the leading edge of the next succeeding sheet Q.

As the leading edge of sheet Q is advanced to be engaged by the peripheral portions of wheels 34 and cylinder 36, it will be suddenly advanced forwardly at a linear rate in excess of the linear rate of travel of web 20 in advance of cutoff roll 30 for imparting a rapid forward pulling action to the severed sheet in order to cleanly break and sever any remaining fibers. As the leading edge of sheet Q is now advanced forwardly that is, to the right in FIGS. 11, 12 and 13, its forward edge will be lifted as it is caused to advance under what is known as an airlift tube 54, the purpose of which is to impart an elevating force to the forward portion of the sheet in the manner of the headed arrow 56 of FIG. 12, for the purpose of positively elevating the leading edge of the sheet into the contacting relationship with brush 40 which literally feeds the leading edge of the sheet onto thread plate 60 of piling screw assembly 42 and beneath thread plate 58 of said assembly. In the preferred embodiment of the invention the piling screw assembly may comprise several spirally arranged thread plates denoted by the numerals 58, 60, 62 and 64, wherein the trailing edge of the lower thread plate 64 has been denoted by the numeral 64–T as will be hereinafter more fully explained.

As the leading edge of sheet Q is advanced forwardly and urged upwardly by reason of the action of the airlift tube, it will be advanced into engagement with rotating brushes 40, which are adapted to be engaged by portions of the upper plates of the piling screw assembly in such a manner as to effectively advance or introduce the leading edge of a sheet Q forwardly between thread plates 58 and 60 of the piling screw assembly.

At this point it should be clearly understood that the various thread plates—58, 60, 62 and 64—comprise the elements of a continuous spiral arranged in screw form; and that rotation of the piling screws of the piling screw assembly 42 will progressively lower the individual sheets which have been fed thereunto; that is, sheet K, as illustrated in FIG. 12, will be continuously lowered downwardly with its leading end or edge L contacting inner face 66 of a stop member 68 which, as will be explained, may comprise a jogger element.

As the individual sheets are released from the lowermost thread plate 64 of the piling screw 42, they are consecutively stacked in vertical formation upon thread plate 72 of the batching screw mechanism 44, which is non-rotatably disposed as illustrated in FIGS. 11, 12 and 15*m* until a predetermined number of individual sheets, such as K and Q, have been vertically stacked thereon, said stack of sheets being indicated generally by the letter R in FIGS. 11–13 and 15–17.

After the desired number of sheets have been stacked, as at R, on thread plate 72 of the batching screw, the assembly is then caused to rotate through one complete revolution for the purpose of discharging the entire stack of sheets R onto a conveying or support mechanism denoted generally by the numeral 46. As soon as the batching screw has thus been rotated once, it will again be positioned in stationary or stopped relationship as in FIGS. 11, 12 and 15, until such time as another series of individual sheets have been consecutively stacked thereon to form a subsequent pile R, after which the batching screw will again be operated once for again discharging the entire batch or pile of sheets R onto conveyor 46.

From the foregoing it will be noted that I have thus provided simple yet highly effective means for positively effecting a positive separation of successive sheets being severed from a continuous web, and of then individually advancing each of said sheets forwardly a predetermined distance to a predetermined location while being completely supported on the thread plates of a piling screw assembly. Then, as said individual sheets are thus forwardly advanced, they are simultaneously being lowered vertically onto the upper surfaces of a plurality of similar sheets which have been stacked upon the lower convolution or thread plate 72 of the batching screws, which are normally stationary but which will be operated in timed sequence with the piling screws 42 after a predetermined number of sheets have been stacked on the batching screws for discharging the entire pile of vertically stacked sheets onto the conveyor 46.

With reference now to FIGS. 15 and 18, I have endeavored to illustrate the particular manner and operative relationship between the leading edges of the uppermost thread plate 70 of the batching screws and the trailing edge 64–T of the lowermost thread plate 64 of the piling screws. It will be noted that the leading edge S of the top thread plate 70 of the batching screw assemblies is provided with an arcuate slot or cutout 74, which is dimensioned to accommodate the depending element or finger 76 provided on the trailing edge 64–T of the lowermost of the thread plate 64 of the piling screw assembly. In operation, finger 76 of the lowermost thread plate 64 of the piling screw assembly will sweep through slot 74 of the upper thread plate 70 of the batching screw assembly in such a manner as to positively wipe downwardly or depress the uppermost sheet of a stack R under leading edge S of the batching screw so that if and when the batching screw is rotated, the leading edge S of the batching screw will always pass over—that is, above—the uppermost sheet of a pile of sheets R on thread plate 72.

By this construction the next sheet U, FIG. 17, of the succeeding batch R′ will be deposited on the upper thread plate 70 of the batching screw and thence advanced downwardly onto thread plate 72 during the rotation of the batching screw incident to discharging of pile R onto the conveyor.

It will be noted, as clearly illustrated in FIG. 15, that during the piling operation of the stack of sheets R they will be supported on the lowermost of the thread plates 72, and that in the stopped position the leading edge S of the batching screw assembly will be disposed outwardly beyond the side edge M of the stacked sheets. Then, as soon as the batching screw is caused to rotate, leading edge S, FIG. 16, will be immediately advanced over the top of the uppermost sheet of the stack of sheets R for thereby positively preventing any additional sheets from being accumulated in pile R.

Figures 8, 9, 10:
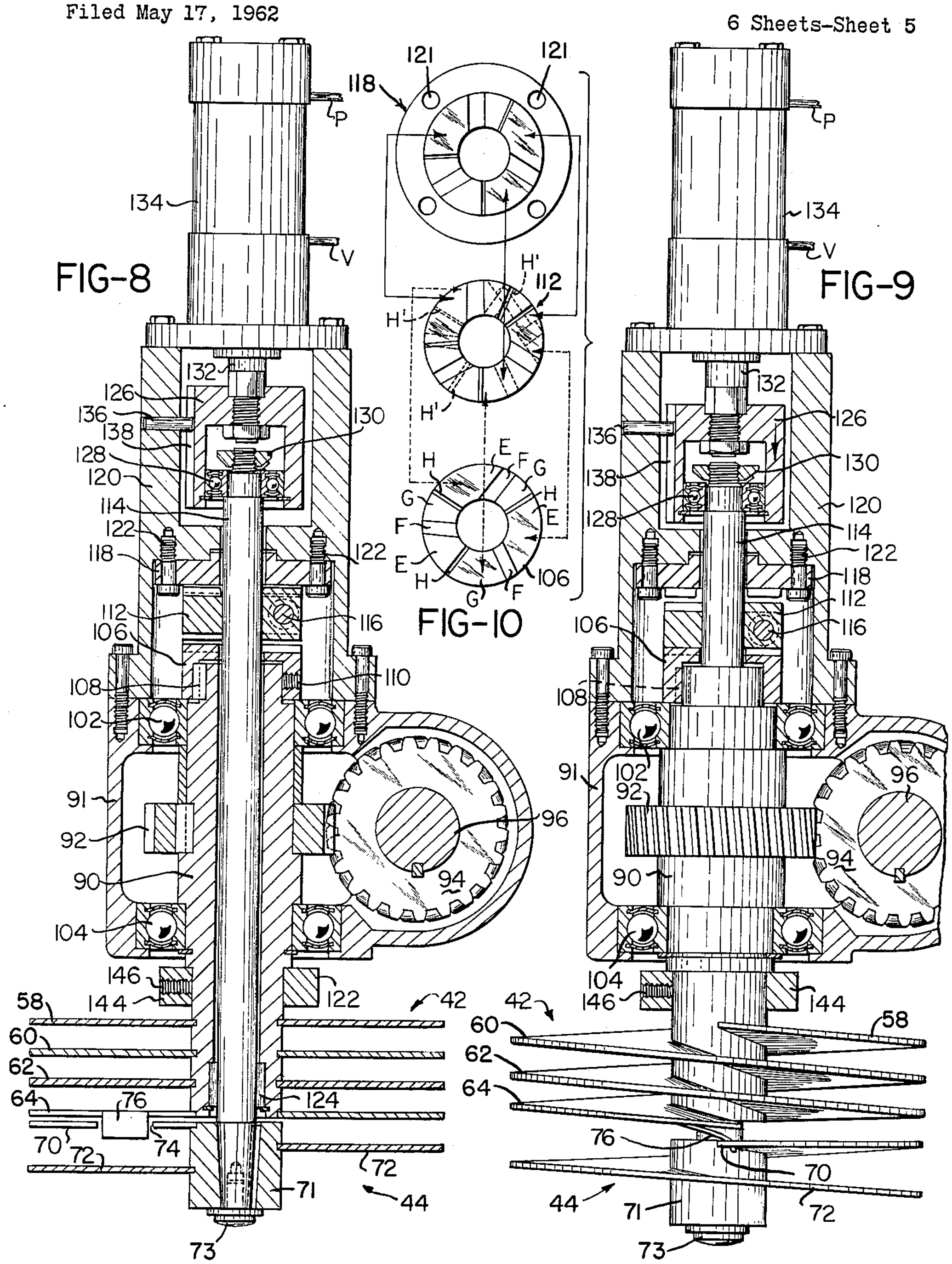
FIG. 8 is a vertical section through the thread plate screw drive and clutching mechanism with the batching screw engaged in a stop position.
FIG. 9 is a view similar to FIG. 8 with the batching screw engaged in driven position.
FIG. 10 is an exploded view of the end faces of the clutch elements of the assembly of FIGS. 8 and 9.

With particular reference now to FIG. 8, I have illustrated the manner in which the piling screws are caused to continuously rotate while the batching screws are maintained in a stationary, non-rotating condition except at such time as when a predetermined number of sheets R have been deposited on the batching screw, at which time the batching screws are actuated for one complete revolution relative to the piling screws.

Figure 2:
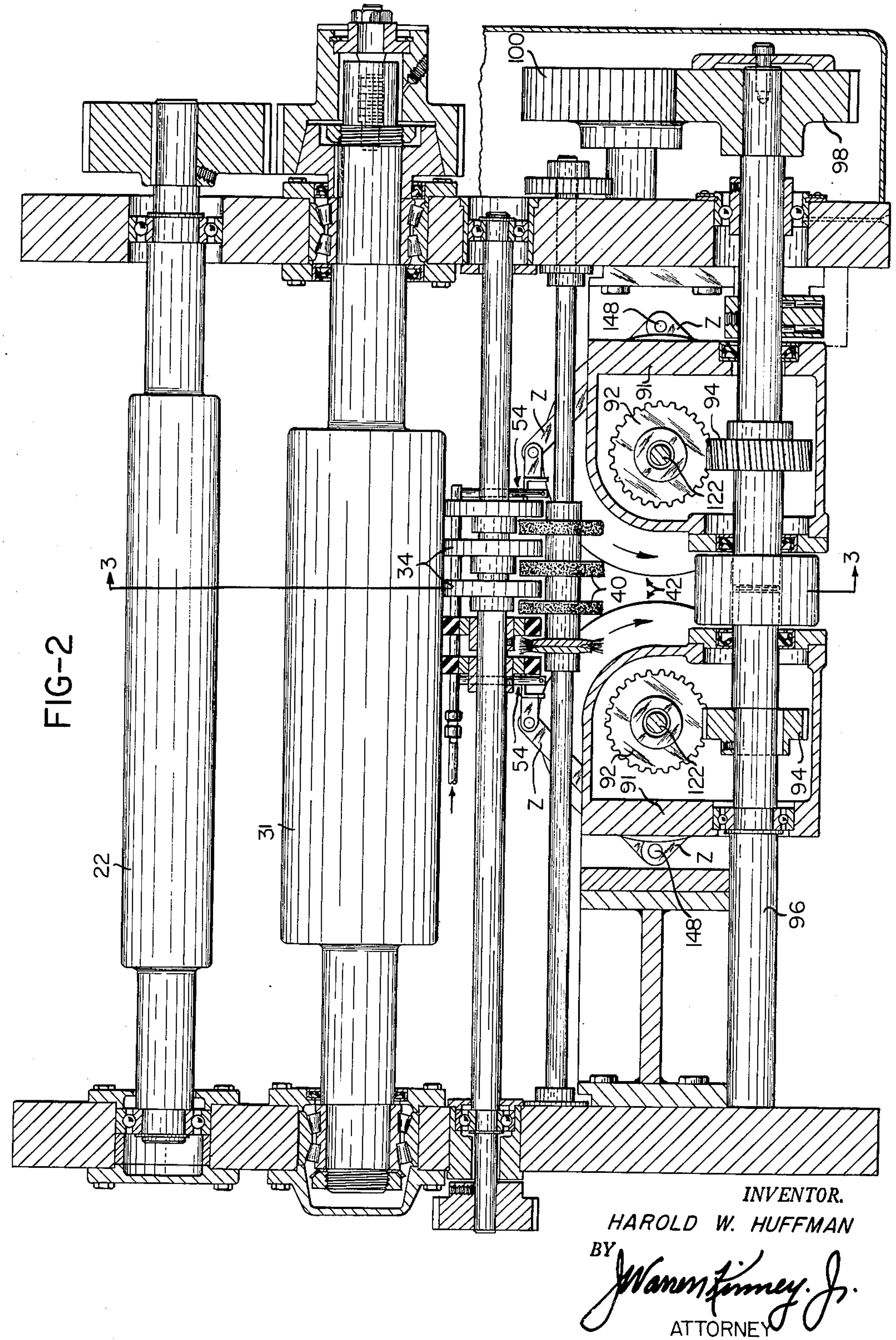
FIG. 2 is a view taken on line 2—2 of FIG. 1.

The numeral 90 denotes a drive sleeve which is suitably mounted for rotation relative to housing 91 in radial bearings 102 and 104. Rotary motion may be imparted to the drive sleeve by means of helix gear 92 suitably keyed thereto, which meshes with spiral gear 94 suitably keyed to drive shaft 96. Drive shaft 96 is illustrated in FIG. 2, being driven by means of a gear 98 which comprises part of a standard gear train assembly which, by way of example, as illustrated in FIG. 2, includes idler gear 100.

It should, of course, be understood that the present invention is not concerned with nor directed to the particular means by which drive shaft 96 is rotated except that its rate of rotation must be correlated with the delivery and drive mechanism of the press with which this device is associated.

The various spirally arranged thread plates 58, 60, 62 and 64 are suitably secured to and carried by the lower end of drive sleeve 90.

The numeral 106 denotes a one-position clutch plate which is secured to and carried by the upper end of drive sleeve 90, to which it may be secured—by way of example, by means of a key 108 and a set screw 110. The upper face of the clutch plate 106 may be subdivided, see FIG. 10, into a plurality of top, lead, and bottom areas or portions, denoted, respectively, by the letters E, F and G, and by a series of driving tooth surfaces denoted by the letter H.

The numeral 112 denotes a dual face clutch plate which is securely though releasably anchored directly to spindle 114 by means of a split assembly secured together by means of a screw 116. The lower face of clutch element or plate 112 includes teeth which are adapted to selectively engage the teeth of the one-position clutch plate 106, which is secured to and carried by the drive sleeve 90, whereas the upper surface of clutch plate 112 is provided with teeth which are adapted to selectively engage co-operative clutch teeth provided in the lower surface of a stop clutch plate 118 which is secured to and carried by housing 120 to which it is affixed by means of screws 122 passing through holes 121.

Spindle 114 is mounted for rotation axially of and relative to drive sleeve spindle 90 which has an axial bore 122 extending therethrough, said sleeve including in its lower end a bearing assembly 124 engaging the lower end of spindle 114. The upper end of said spindle is rotatably secured to the lower portion of an axially shiftable connector element 126 at bearing 128. The inner race of the bearing is secured to and carried by the upper end of the spindle with which it rotates, whereas the outer race of the bearing is suitably and conventionally secured to, carried by, and fastened to the connector element 126.

The inner race of bearing 128 may be secured relative to spindle 114 such as, by way of example, by a jam nut 130.

The spiral thread plates 70 and 72 may be carried by a hub 71 secured to the lower end of spindle 114 by means of a bolt or other suitable connector element 73.

Connector element 126 is secured to and carried by the lower end of piston rod 132 of an air cylinder 134, which is mounted to the upper end housing 120, as clearly illustrated in each of FIGS. 8 and 9.

A pin 136 secured to and carried by housing 120 is adapted to slidably engage and be received within a longitudinal or axial groove 138 provided in the outer surface of connector element 126 for restraining the connector element from rotating or turning movement and for limiting its movement to axial endwise movement relative to housing 120.

With particular reference now to FIG. 19, it will be noted that arm 200 of a micro switch 202 may be actuated by a lug, cam or the like 180 secured to and/or rotatable with cylinder 31 for completing an electric circuit through conductors 175 and 176 to an electronic counter 204 which includes suitable means for completing an electric circuit via conductors 178 and 179 to the solenoid 206 of a solenoid valve 208 after a predetermined number of electrical impulses have been impressed upon counter 204.

It should be understood that the electric impulses to the electronic counter may originate at or be derived from any other portion of the machine in advance of the cut-off roll 34 just so long as the impulses will be accurately correlated to the repeat length of each sheet or sub-assembly as finally severed by the cut-off roll. In other words, the impulses could originate on or at the printing cylinder of a press, instead of at the cut-off roll, as illustrated in FIG. 19.

Pressure media, such as, by way of example, compressed air, from conduit 210 is normally and continuously applied, via conduit V to the lower end of cylinder 134 for urging and maintaining the piston rod 132 at the upper end of its stroke, as illustrated in FIG. 8.

When the electronic counter actuates the solenoid, the pressure media from conduit 210 is immediately applied to the upper end of the cylinder via conduit P for urging the piston rod downwardly to effect disengagement of the upper face of clutch element 112 from the lower surface of the stop clutch plate 118 and engagement of the lower face of said clutch element 112 with the upper face of clutch plate 106 to impart but one revolution to spindle 114.

As soon as the pressure is released from the upper end of the cylinder, pressure is automatically restored to the lower end of the cylinder by the time the spindle is rotating through the first 180° of its revolution with the result that clutch element will be disengaged from clutch plate 106 and engaged with the stop cluch plate 118 by the time the revolution has been completed.

The present invention is neither directed to nor concerned with the specific structural details of the electronic counter and/or solenoid valve, it being understood that such devices are conventional and commercially available. The electronic counter may include suitable means for enabling an operator to set the number of electrical impulses which are impressed on the counter before the counter closes an electric circuit to the solenoid valve, it being understood that the aforesaid number of impulses determines the number of severed sheets or sub-assemblies whch are permtted to accumulate on the thread plate 72 of the batching screws before the said batching screws are rotated, FIGS. 15, 16, 17 for depositing the entire pile of sheets or subassemblies R onto conveyor 46.

To summarize the foregoing, the air cylinder 134 is actuated by the electronic counter 204 which accurately counts the number of sheets or sub-assemblies which are deposited in a pile or stack R. Cylinder 134 is actuated actually approximately 180° prior to deposit of the last or uppermost sheet of a stack R onto the batching screw plate 72 for urging the spindle 114 and its dual face clutch plate 112 downwardly whereby the lower face of clutch plate 112 will tend to engage the upper surface of the one-position clutch plate 106. As soon as the relative rotation between clutch plate elements 106 and 112 is such as to permit the teeth to engage, the continuous rotary motion of drive shaft 90 will be imparted to spindle 114 through the clutch assembly for imparting one full and complete revolution to the spindle, 180° after which cylinder 134 will have been actuated in a reverse or upward direction for lifting or shifting spindle 114 upwardly for effecting engagement between the upper surface of the dual face clutch plate 112 with the lower surface of the stop plate clutch 118. By reason of this construction, the batching screw assembly 44 will be driven throughout one complete revolution, after which it will be positively stopped to remain in stationary condition until such time as the desired number of sheets have been again piled upon thread plate 72, after which the above described actuation of cylinder 134 will occur.

The relationship between the dual faces of the clutch plate 112 with respect to the one-position clutch plate driving clutch plate 106 and the stop clutch plate 118 is such that the teeth element of the dual face clutch plate is in engagement with one or the other of the driver teeth of the clutch plate 106 or teeth of the stop clutch plate 118. Cylinder 134 is utilized to pre-load the downward or clutch-engaging force applied to the spindle 114 just prior to the initiation of a driving cycle to the batching screw in such a manner as to instantaneously shift the engagement of the dual face clutch plate 112 from engagement with the stationary stop clutch plate 118 to the teeth of the driving clutch plate 106; and as soon as this driving relationship has been established and 180° before the revolution has been completed, the cylinder is caused to exert an upward force on the spindle for exerting a disengaging force on the clutch plate 112, which force, however, will not become effective until after a complete revolution of the spindle has been accomplished, at which time the engagement of the dual face clutch plate 112 will instantaneously shift from driven connection with the drive sleeve 90 to the stationary position of the stop clutch plate 118.

With particular reference now to FIGS. 8, 9, 5 and 6, the numeral 144 denotes a cam which is secured to and carried by the drive sleeve 90 being secured thereto, such as, by way of example, a set screw 146.

The letter Z denotes a series of jogger arms which are arranged in pairs wherein the common end of the arms of a pair are pivotally interconnected as at 148, which, as indicated in FIG. 6, is pivotally secured also to a portion of the frame 149.

The free outer end of each of the jogger arms Z is provided with and/or terminates in an angle bracket 154 having a pair of right angularly disposed faces X and Y, which are adapted to engage the adjacent side and end portions of the sheets being piled.

A spring, such as 152, interconnects arms Z intermediate their ends for normally and yieldably urging the free outer ends thereof toward one another and for exerting a yielding force for continuously maintaining followers 150 in contacting relationship with the outer periphery of the cam 144.

From the foregoing, it will be noted that rotation of cam 144 will cause the arms Z to be shifted inwardly to the position illustrated in solid outline in FIG. 5, whereby legs X and Y will momentarily engage the adjacent edges of the sheets, after which the arms will be moved outwardly to the position illustrated in broken outline of the angle brackets 154 as the followers are disposed on the outer peripheral surface of the cams. The jogging action of arms Z is such as to be synchronized with the arrival of each sheet in the piler section of the device. Suitable means may be provided for effectively adjusting the relationship of the angle brackets 154 with reference to the individual arms Z and also for adjusting the relationship of the followers 150 with reference to the cam face 144.

With particular reference to FIG. 4, the numeral 54 denotes generally the airlift tube assembly which, it will be noted, comprises an air-supply tube 160 which discharges into a U-shaped housing 162 open at its rear end 164 and bottom 166. The forward end of the housing is closed as at 168, however the forward end of the top 170 is open as at 172.

When air is discharged under pressure, through tube 160 into the interior of housing 162, the well-known Bernulli effect will occur with the result that a low pressure area will be created in the housing into which air from the atmosphere will flow or rush and thereby exert a continuous lifting action on the forward end or any portion of a sheet passing thereunder. In other words, this simple device provides means for providing air pressure beneath a moving sheet of greater magnitude than the air pressure above the sheet in housing 162. This pressure differential exerts a continuous lifting action to the sheets being moved beneath said housing.

Figure 7:
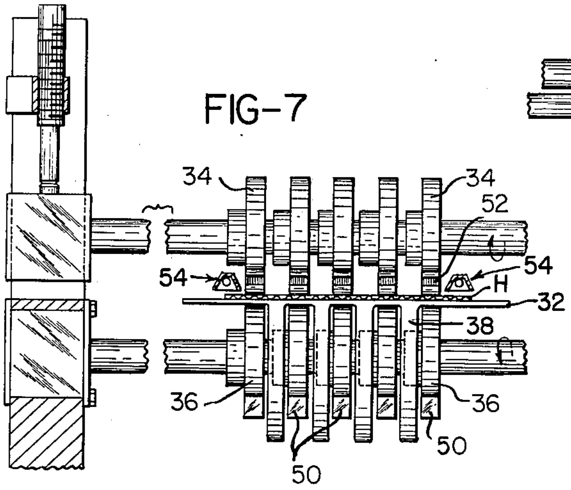
FIG. 7 is a view taken on line 7—7 of FIG. 3.
Figure 14:
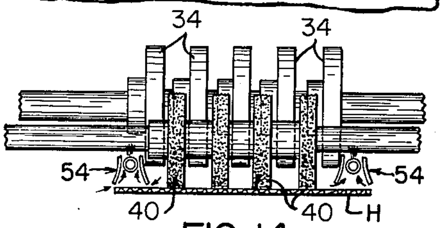
FIG. 14 is an end view disclosing the relationship of air-lift tubes, of a modified design, in association with the brushes and a sheet which is lifted into contacting relationship with said brushes by the action of the air-lift tubes.

In FIGS. 7 and 14 sheet K is shown in elevated or lifted condition in contact with brushes 40 by reason of the pressure differential created within the airlift tubes 54.

What is claimed is:

1. A machine of the character described for assembling batches of a predetermined number of continuously fed sheets of material of equal length, comprising rotary means for individual receiving each sheet and lowering it, means rotatable coaxially with the first means for supporting a plurality of said sheets in vertically stacked condition beneath said lowering means, and means for activating said last mentioned means for rotating the latter and for discharging all of the sheets stacked thereon.

2. A machine of the character described for assembling batches of a predetermined number of continuously fed sheets of material of equal length, comprising a pair of laterally spaced piling screws and a pair of batching screws, each batching screw being in vertical alignment with a piling screw means, continuously rotating said piling screws, means whereby said batching screws may be rotated intermittently, said batching and piling screws including spirally arranged thread plates, the thread plates of said piling screws being arranged to receive, advance and lower the sheets individually as they are fed to the machine and to pile said sheets in vertically stacked condition upon thread plates of said batching screws, and means for rotating said batching screws after a predetermined number of sheets have been piled thereon for discharging the pile of sheets as a unit and for re-positioning the thread plates of said batching screws relative to said piling screws for supporting and accumulating another pile of sheets.

3. A machine of the character described, including a first means for supplying a series of sheets in contiguous sequence, and additional means for individually feeding said sheets into a prescribed stack and subsequently discharging said stack, said additional means including a pair of vertical axially spaced sleeves, feed screws carried by the sleeves having their body portions spaced to permit of passage of a sheet therebetween and having wide helical feeding and guide ribs to successively support on their top surfaces the edges of individual sheets, said screws having opposite direction threads, means for rotating the sleeves and screws in opposite directions, whereby the ribs provide forwardly moving descending support surfaces for individual sheets, means for consecutively guiding the sheets of a series into overlying position as respects the upper portion of said ribs for forward and downward feeding thereby, and vertically extending guide members located adjacent the feed screws having portions for lateral and terminal engagement with the sheets during their forward and downward movement to restrain and limit forward progress and lateral twisting of the sheets.

4. A machine as specified in claim 3, including means for vibrating the guide members to vertically align the sequence of sheets during stack-piling thereof.

5. A machine as specified in claim 3, including means for vibrating the guide members to vertically align the sequence of sheets during stack-piling thereof, said means including cams rotated in synchronism with the feed screws, followers riding on the cams, and linkage connecting the followers and guide members to vibrate the members.

6. A machine of the character described, including a first means for supplying a series of sheets in contiguous sequence, and additional means for individually feeding and piling said sheets into a prescribed stack and subsequently discharging said stack, said additional means including a pair of vertical axially spaced sleeves, feed screws carried by the sleeves having their body portions spaced to permit of passage of a sheet therebetween and having wide helical feeding sheet supporting ribs to underlie and support the edges of individual sheets, said screws having opposite direction threads, means for rotating the sleeves and screws in opposite directions, whereby the ribs provide forwardly moving descending support surfaces for individual sheets, means for consecutively guiding the sheets of a series into overlying position as respects the upper portion of said ribs for forward and downward feeding thereby, batch supporting and discharge screws, means rotatably supporting said discharge screws in axial alignment with the feed screws, means for locking the discharge screws against rotation, the screws having helical feed ribs to receive and support a batch of sheets as supplied by the piling screws and having their leading edges laterally offset as respects the lateral edges of the sheets being piled when the discharge screws are locked against rotation to permit gravity feed of individual sheets past said leading edges onto the body of the ribs, and means to release the screws and effect rotation thereof in synchronism with the rotation of the feed screws for discharge of a supported batch of sheets.

7. A machine as specified in claim 6, in which the trailing edges of the feed screw ribs have fingers positioned to interfit with the leading edges of the discharge screws during synchronous rotation of the screws to seal off the batch for discharge and restrict feed of the initial sheet of a succeeding batch.

8. The invention as defined by claim 6, wherein the said means rotatably supporting said discharge screws includes a rotatably supported shaft extending through each of the said sleeves, and the said means for locking and releasing the piling screws comprises a clutch mechanism embodying a plate part connected to the sleeve to rotate therewith, a stationary plate part and a shiftable plate part, said shiftable plate part being secured to said shaft and being movable between and for selective coupling with the stationary plate part and the sleeve connected plate part, and means for effecting the selective coupling of said plate parts.

9. The invention as defined by claim 8, wherein said discharge screw supporting shaft has limited axial movement in its encasing sleeve and the said means for effecting said selective coupling of the plate parts comprises a power unit operatively coupled with the screw supporting shaft, and sheet counting means operatively coupled to said power means for actuating the latter.

10. The invention as defined by claim 6, wherein the first said means comprises a web feeding and cutting mechanism for forming the said series of sheets and means for receiving the sheets and projecting the same in the same contiguous sequence onto the said sheet supporting ribs of said feed screws.

11. A machine for assembling sheets of relatively light weight material such as paper, said machine comprising a pair of vertical, relatively long, spaced screw conveyors rotatable on vertical axes, each of said conveyors embodying an upper feeding screw section and a bottom batching screw section, said conveyors having relatively widely spaced thread plates, means for continuously rotating the upper feeding screw sections in opposite directions for downward feeding of a sheet supported between and on the thread plates, means for intermittently rotating the lower batching screw sections in the same directions as the adjacent feeding screw sections, means for feeding sheets between the upper feeding screw sections at the top ends thereof and onto the upper thread plates to be supported at opposite edges by and between the plates and to be lowered thereby in a continuous flow during a non-rotating period of the batching screw sections, means for transferring the sheets from the bottom thread plates of the feeding screw sections onto the upper thread plates of the batching sections while the latter are stationary for batching a pre-determined number of sheets thereon, and means for effecting a batch discharging rotation of said batching screw sections while maintaining rotation of the feeding screw sections.

12. The invention as defined by claim 11, wherein the said means for feeding sheets between the upper feeding screw sections at the top ends thereof comprises a gripper wheel and a cylinder therebelow, a support across which the sheets are moved toward and to be engaged between said gripper wheel and cylinder, and cooperating means carried by the cylinder and gripper wheel to engage the trailing edge of a sheet and advance the sheet to move said trailing edge forwardly from the leading edge of a following sheet.

13. The invention as defined by claim 11, wherein the said means for feeding sheets between the upper feeding screw sections and the top ends thereof comprises a gripper wheel and a segmented cylinder therebelow having annular grooves, a support for receiving and guiding sheets toward said gripper wheel and cylinder to be engaged between the same, said support including stripping fingers lying in said grooves and extending forwardly and downwardly between the cylinder and adjacent upper screw plates, and cooperating means carried by the cylinder and gripper wheel to engage the trailing end edge of a sheet and advance the sheet to move said trailing edge forwardly from the leading edge of a following sheet, said cooperating means consisting of a depressor member carried by the gripper wheel and a notch in the periphery of the cylinder into which the said trailing edge of the sheet is depressed by the depressor member, and said stripper fingers being disposed in the downwardly extending portions thereof to disengage the advancing sheet from said notch.

14. The invention as defined by claim 13, with rotating feeding brush means disposed forwardly of the gripper wheel and cylinder and above the topmost thread plates of the upper feeding screw sections, and air lift means positioned relative to said brush means and to said gripper wheel and cylinder for imparting an elevating force to the forward end portion of a sheet advancing from the gripper wheel and cylinder to positively elevate said leading edge into engagement with said brush means whereby the said leading edge of the sheet is fed by the engaging brush means onto the tops of said threaded plates.

References Cited by the Examiner

UNITED STATES PATENTS

| | | | |
|---|---|---|---|
| 204,097 | 5/1878 | Sawyer | 83—91 |
| 1,569,032 | 1/1926 | Reichel | 198—35 |
| 1,656,285 | 1/1928 | Molins | 271—87 |
| 2,059,960 | 11/1936 | Parsons | 271—87 |
| 2,224,279 | 12/1940 | Underwood | 83—94 |
| 2,327,103 | 8/1945 | Gude | 83—94 |
| 2,407,782 | 9/1946 | Hardy | 214—6 |
| 2,574,269 | 11/1951 | Lange | 83—94 |
| 2,895,552 | 7/1959 | Pomper et al. | 83—94 |

FOREIGN PATENTS

| | | |
|---|---|---|
| 201,240 | 9/1908 | Germany. |

ROBERT B. REEVES, *Primary Examiner.*

HUNTER C. BOURNE, *Examiner.*